United States Patent [19]

Mason

[11] Patent Number: 4,592,251
[45] Date of Patent: Jun. 3, 1986

[54] TWO SPEED ACCESSORY DRIVE

[75] Inventor: Murray R. Mason, Kent Bridge, Canada

[73] Assignee: Canadian Fram Limited, Ontario, Canada

[21] Appl. No.: 478,757

[22] Filed: Mar. 25, 1983

[51] Int. Cl.⁴ .............................................. F16H 57/10
[52] U.S. Cl. ..................... 74/785; 192/18 B
[58] Field of Search ............... 74/785, 755, 750 R, 74/796, 788, 772, 798, 690, 721; 192/84 C, 18 B; 188/161, 163

[56]        References Cited
         U.S. PATENT DOCUMENTS

| | | | |
|---|---|---|---|
| 1,464,887 | 8/1923 | Starr | 74/750 R |
| 1,998,891 | 4/1935 | Benson | 74/750 R |
| 2,500,447 | 3/1950 | Bitzer | 74/781 R |
| 2,659,249 | 11/1953 | Carr | 74/785 |
| 3,082,647 | 3/1963 | Banker | 74/785 |
| 3,181,670 | 5/1965 | Leive | 192/84 C |
| 3,190,420 | 6/1965 | Kampf | 192/84 C |
| 3,338,349 | 8/1967 | Klinkenberg et al. | 188/161 |
| 3,368,657 | 2/1968 | Wrensch et al. | 188/161 |
| 4,223,927 | 9/1980 | Kobayashi et al. | 74/750 R |
| 4,337,855 | 7/1982 | Bennett | 188/163 |

Primary Examiner—Lawrence Staab
Assistant Examiner—David A. Novais
Attorney, Agent, or Firm—Markell Seitzman; Russel C. Wells

[57]         ABSTRACT

A two speed drive comprising: a driving member; a rotatable driven member coaxially positioned relative to the driving member; a planetary gear system rotatable with the driving member and with the driven member for providing in one condition a non-reducing speed drive and for providing in a second condition a speed reducing drive therebetween, the gear system including a sun gear drivingly engaging the driving member, a ring gear mounted for rotation about said driving member, and a plurality of planetary gears interconnecting the sun gear and the ring gear, the driven member attached to and carried with the planetary gears; and a electromagnetic clutch, operable in a first mode for simultaneously driving the sun gear and the ring gear in the one condition to establish a non-reducing speed drive and operable in a second mode to rotationally lock the ring gear for driving the driven member through the sun gear and the planetary gears at a speed less than the speed of the driving member.

7 Claims, 4 Drawing Figures

TWO SPEED ACCESSORY DRIVE

BACKGROUND AND SUMMARY OF THE INVENTION

This invention relates to two speed accessory drives and is related to my prior filed, commonly assigned patent application entitled "Differential Drive Mechanism", U.S. Pat. No. 4,484,495 issued Nov. 27, 1984. In the above noted application there was proposed a differential drive mechanism utilizing a planetary gear and an electromagnetic clutch to provide a two speed driving mechanism for engine accessories which provides for increased engine fuel economy and increased acceleration performance. This mechanism permitted engine driven belt accessories to be driven at a high drive ratio during engine idle and at a lower drive ratio during highway cruise conditions or when the vehicle is accelerated. In this manner the parasitic drag inherent with these belt driven accessories is reduced, thus improving engine and vehicular performance. The present invention provides the above features and advantages and further reduces the torque transmitting requirement at the friction surface yielding a further improvement in performance and further reducing the torque transmitted by and across the planet or pinion gear of the planetary gear set.

According to the specific embodiment described in detail below, the present invention comprises a two speed drive comprising: a driving member; a rotable driven member coaxially positioned relative to the driving member; planetary gear means rotatable with the driving member and with the driven member for providing in one condition a non-reducing speed drive and providing in a second condition a speed reducing drive therebetween, the gear means including a sun gear drivingly engaging the driving member, a ring gear mounted for rotation about said driving member, and a plurality of planetary gears interconnecting said sun gear and the ring gear, the driven member attached to and carried with the planetary gears; and electromagnetic clutch means, operable in a first mode for simultaneously driving the sun gear and the ring gear in the one condition to establish a non-reducing speed drive and operable in a second mode to rotationally lock the ring gear for driving the driven member through the sun gear and the planetary gears at a speed less than the speed of the driving members.

Many other objects, features and advantages of the invention will be clear from the detailed description of the drawings.

DETAILED DESCRIPTION OF THE DRAWINGS

Figure 1:
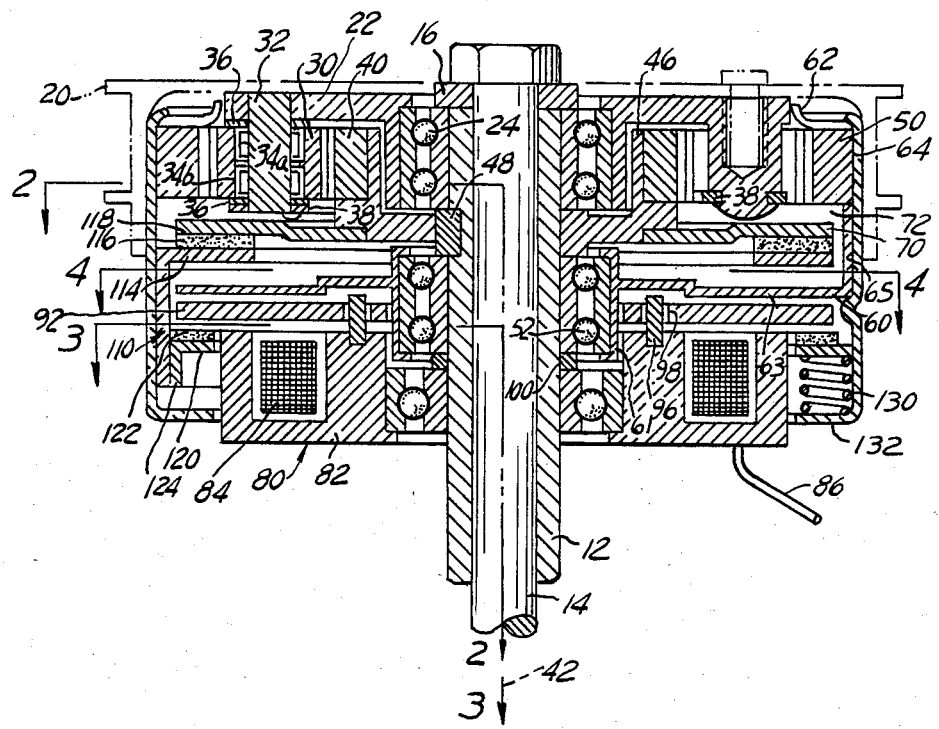
FIG. 1 illustrates a cross-sectional view of a two speed accessory drive.
Figure 2:
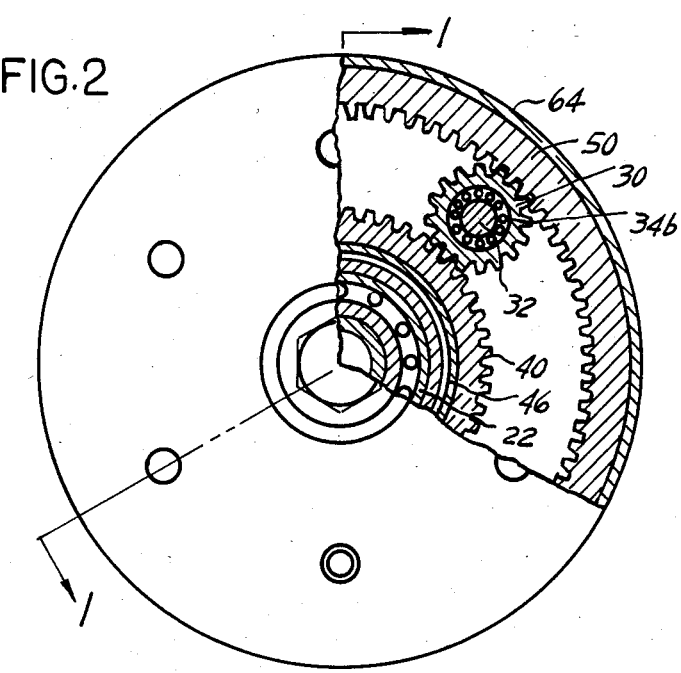
FIG. 2 illustrates a partial sectional view taken through Section 2—2.
Figure 3:
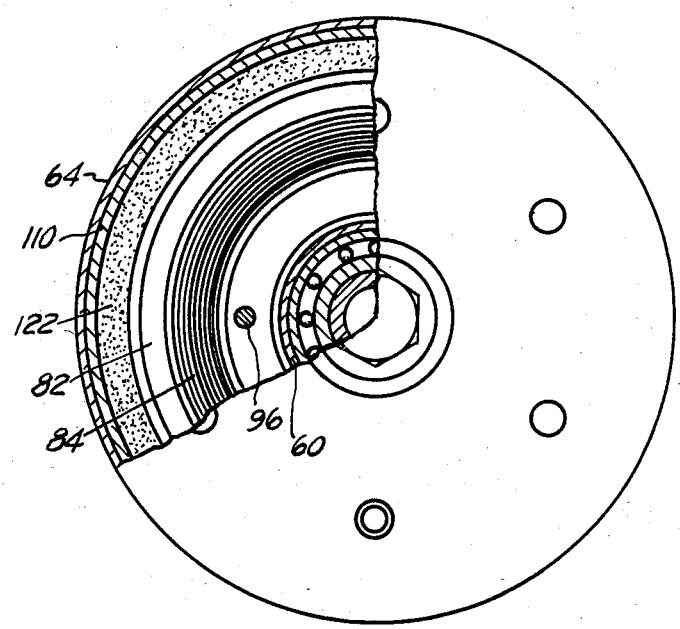
FIG. 3 illustrates a further partial sectional view taken through Section 3—3 of FIG. 1.

There is shown a two speed drive that is generally designated by the numeral 10. The drive 10 includes a hollow input shaft 12 that is mounted for rotation with the engine crankshaft not shown. More particularly, the input shaft 12 is mounted to the engine crankshaft by a bolt 14, and washer 16. An output member or pulley 20 (shown in dotted line) is mounted to a carrier hub 22. As discussed below, the carrier hub 22 also functions as a planet gear carrying member. The carrier hub 22 is mounted for rotation relative to the input shaft 12 by the bearings 24. A plurality of pinion or planet gears 30 are mounted to the carrier hub 22 by a like plurality of pins 32 and needle bearings such as 34a and b. Each pinion gear 30 is mounted to engage a sun gear 40 that is coaxial to the axis 42 of the input shaft 12. Each pinion gear 30 is maintained in proper axial alignment relative to the carrier hub 22 and carrier plate 38 by the thrust washers 36 that are fitted to each of the pins 32. More particularly, the sun gear 40 is mounted to an annluar drive hub 46. The drive hub 46 is mounted for rotation with the input shaft 12 and is driven directly by a key 48. A ring gear 50 is mounted about the plurality of planetary pinion gears 30 in coaxial relation to the axis 42. The ring gear 50 is mounted for rotation relative to the axis 42 and is supported by a retainer 60 which rides on bearings 52. A shield 62 is mounted to the ring gear 50 and extends toward the carrier hub to prevent contaminants from entering therein. In addition, a drum 64 extends from the ring gear 50 and is fixedly connected to the retainer 60. In this manner the ring gear 50, drum 64 and retainer 60 rotate as an integral member. The retainer 60 comprises a central portion 61 adapted to fit about the bearings 52, a radially extending base portion 63 and a plurality of spaced members 65 extending axially from the radial portion 63. The spaced members 65 and radial portion 63 form a spline 140 having alternating lands 142 and recesses 144 which can be seen in FIG. 4. The spaced members 65 fit against the inner wall of the drum 64. The members 65 may be welded or pinned to the drum 64 in a known manner. Another function of the drum 64 is to enclose the various drive members interior thereto within a cavity 72.

A clutch plate 70 is attached to and rotates with the drive hub 46 and extends to the cavity 72.

Figure 4:
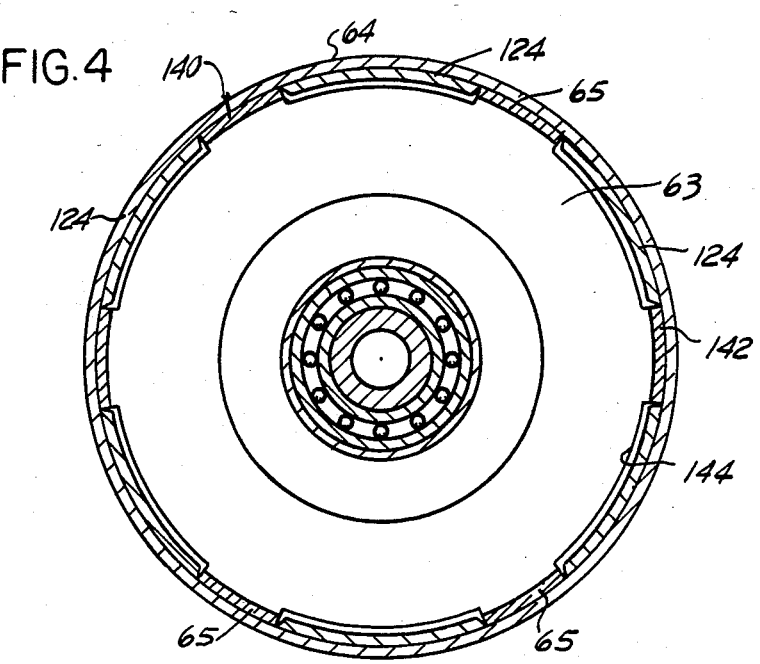
FIG. 4 illustrates a full sectional view taken through Section 4—4 of FIG. 1.

The drive 10 further includes an electromagnet 80 having a magnetic core 82 and a plurality of coils of wire 84. An anti-rotation arm or support 86 extends from the magnetic core 82 and is used to attach the electromagnet to the engine and thus prevents the electromagnet from rotating. The electromagnet 80 is mounted and supported relative to the input shaft 12 by another bearing 90. The electromagnet 80 further includes an armature 92 that is positioned within cavity 72 and is permitted to move axially relative to the magnetic core 82. Drive pins 96 may be provided extending from the magnetic core through openings 98 in the armature to provide axial alignment therebetween. The drive pins 96 may be formed by projecting portions of the magnetic core 82. The drive pins also prohibit the armature 92 from rotating. To insure for the alignment between bearings 90 and 52, a spacer 100 is lodged therebetween. The drive 10 further includes a movable clutching member 110 including an axially extending member 124. The member 110 is fitted to and rotationally carried with the retainer 60. The relationship between the member 124 of member 110 with the spaced members 65 of retainer 60 is illustrated in FIG. 4. The splines 140 of the retainer 60 further permit the axial movement of the clutching member as hereinafter described. As described below the clutching member 110 supports two friction materials. The clutching member 110 further includes a first inwardly extending annular member 114 having attached thereto a friction material 116 which is adapted to engage a friction face 118 of the clutch plate 70. The clutching member 110 further includes a second inwardly extending annular member 120 which carries thereon another friction material 122. The two annular members 114 and 120 respectively are connected by a plurality of axially extending members 124 which interdigitate between the lands 142 and recesses 144 of the spline 140. In this manner the clutching member 110 will move axially through the retainer 60 and will be rotationally carried with it. A plurality of preferably evenly spaced springs 130 are fitted between an inwardly extending portion 132 of the drum 64 and the member 120 thereby normally biasing the clutching member 110 (i.e., the friction material 116) into engagement with the friction face 118 of the clutch plate 70. FIG. 1 illustrates only one of the springs 30.

The drive 10 has two modes of operation, i.e., a non-speed reduction mode and a speed reduction mode. When the non-speed reduction mode of operation is required the electromagnet 80 is not energized. In this condition, the plurality of springs 130 yieldably urges the clutching member 110 into engagement with the clutch plate 70 by virtue of the engagement of the friction material 116 with the friction surface 118. This frictional engagement permits the ring gear 50 to be driven at crankshaft speed through the key 48, drive hub 46, clutch plate 70, friction face 116 and clutching member 110. The clutching member 110 by virtue of the spline 140 rotationally engages the retainer 60 which in turn drives the drum 64 and the ring gear 50. During this mode of operation, the drive hub 46 which is also driven at engine speed drives the sun gear 40. Consequently, a mode of operation is obtained wherein the sun gear 40 and the ring gear 50 both rotate at crankshaft speed and carry therewith the plurality of pinion gears 30. These pinion gears 30 do not rotate relative to either the sun gear 40 or the ring gear 50. The pinion gears 30 drive the output or driven member 20 through the carrier hub 22. It is significant to note that in this mode of operation, the torque transmitted from the input shaft 12 to the driven member 20 is shared between the drive hub 46—sun gear 40—pinion gear 30 connection and the drive hub 46—clutch plate 70—ring gear 50 connection. In this manner, the clutch plate 70 is required to transmit merely a fraction of the torque necessary to drive the output member 20. In addition, since both sides of the pinion gears 30, that is, the portion of each pinion gear 30 engaging the ring gear 50 and another portion of the pinion gear 30 engaging the sun gear 40 are both pushed or torqued in the same direction. Consequently, each tooth of the pinion gear 30 is subject to less torque which improves its operation and useful life as compared with similar gear sets of the prior art. In the other mode of operation, that is, when a speed of reduction is desired, the electromagnet 80 is energized thereby attracting the armature 92 into engagement with the friction material 122 carried by the member 120. The armature 92 as it proceeds toward the electromagnet 80 engages and axially pushes the clutching member 110 out of engagement with the clutch plate 70. Since the armature 92 is rotationally fixed relative to the electromagnet 80 by the pins 96, the engagement of the armature with the clutching member 110 thereby locks the ring gear 50 in place. The disengagement at the friction surface 118 causes a running clearance between the clutch plate 70 and the friction material 116. Since as mentioned above, the ring gear 50 is fixed in a non-rotating condition, the output member 20 is driven at a reduced speed by virtue of the fact that each pinion or planetary gear 30 is now permitted to rotate relative to the ring gear 50.

Many changes and modifications in the above described embodiment of the invention can of course be carried out without departing from the scope thereof. Accordingly, that scope is intended to be limited only by the scope of the appended claims.

What is claimed is:

1. A two speed drive comprising:
a driving member;
a rotatable driven member coaxially positioned relative to the driving member;
planetary gear means rotatable with said driving member and with said driven member for providing in one condition a non-reducing speed drive and for providing in a second condition a speed reducing drive therebetween, said gear means including a sun gear drivingly engaging said driving member, a ring gear mounted for rotation about said driving member, a plurality of planetary gears interconnecting said sun gear and said ring gear, and drive hub means for supporting said sun gear relative to said driving member, said driven member attached to and carried with said planetary gears;
electromagnetic clutch means, operable in a first mode for simultaneously driving said sun gear and said ring gear in said one condition to establish a non-reducing speed drive and operable in a second mode to rotationally lock said ring gear for driving said driven member through said sun gear and said planetary gears at a speed less than the speed of the driving member, including:
a clutch plate attached to and rotatable with said drive hub means, the extreme portions of said clutch plate supporting a first friction face;
a clutching member rotationally movable with said ring gear and axially movable relative to said driving member and said ring gear, said clutching member movable in an axial direction in response to magnetic forces and movably urged in an opposite direction by clutch springs to cause a frictional engagement with said friction face to permit said ring gear to rotate with said driving member; and
a drum circumferentially positioned about and rotatable with said ring gear, said drum rotationally supported relative to said driving member by a retainer which rotates with said drum and said ring gear and wherein said clutching member is fitted to and rotationally carried with said retainer such that when said clutching member has moved in said axial direction it is rotationally fixed thereby rotationally fixing said ring gear, said drum and said retainer.

2. The drive as defined in claim 1 wherein said clutching member includes a plurality of axially extending members connected for axial movement relative to and rotatable with an inner surface of said drum, said axially extending members interdigitating with recesses formed in said retainer, said axially extending members supporting an annular inwardly directed member, positioned proximate said clutch plate and upon which is secured friction material for engagement with said clutch plate.

3. The drive as defined in claim 2 wherein said clutch springs are positioned between an inwardly extending portion of said drum and said first member for biasing said clutching member towards said clutch plate.

4. The drive as defined in claim 3 wherein said electromagnetic magnetic clutch means includes a stationary core including a plurality of axially extending pins and wherein said armature includes a like number of openings for receiving said pins.

5. A two speed drive comprising:

a driving member;

a rotatable driven member coaxially positioned relative to the driving member;

planetary gear means rotatable with said driving member and with said driven member for providing in one condition a non-reducing speed drive and for providing in a second condition a speed reducing drive therebetween, said gear means including a sun gear drivingly engaging said driving member, a ring gear mounted for rotation about said driving member, a plurality of planetary gears interconnecting said sun gear and said ring gear, and drive hub means for supporting said sun gear relative to said driving member, said driven member attached to and carried with said planetary gears;

electromagnetic clutch means, operable in a first mode for simultaneously driving said sun gear and said ring gear in said one condition to establish a non-reducing speed drive and operable in a second mode to rotationally lock said ring gear for driving said driven member through said sun gear and said planetary gears at a speed less than the speed of the driving member, including:

a clutch plate attached to and rotatable with said drive hub means, the extreme portions of said clutch plate supporting a first friction face;

a clutching member rotationally movable with said ring gear and axially movable relative to said driving member and said ring gear, said clutching member movable in an axial direction in response to magnetic forces and movably urged in an opposite direction by clutch springs to cause a frictional engagement with said friction face to permit said ring gear to rotate with said driving member; and a drum circumferentially positioned about and rotatable with said ring gear, said drum rotationally supported relative to said driving member by a retainer which rotates with said drum and said ring gear and wherein said clutching member is fitted to and rotationally carried with said retainer such that when said clutching member has moved in said axial direction it is rotationally fixed thereby rotationally fixing said ring gear, said drum and retainer, and wherein said clutching member includes a plurality of axially extending members connected for axial movement relative to and rotatable with an inner surface of said drum, said axially extending members interdigitating with recesses formed in said retainer, said axially extending members supporting an annular inwardly directed member, positioned proximate said clutch plate and upon which is secured friction material for engagement with said clutch plate and another friction material and wherein said electromagnetic clutch further includes an armature rotationally fixed and axially movable in response to the magnetic field during the second mode for frictionally engaging said another friction material to prevent said clutching member from rotating and wherein said clutching member comprises another annular inwardly extending member carrying thereon said another friction material.

6. The drive as defined in claim 5 wherein said clutch springs are positioned between an inwardly extending portion of said drum and said another annular inwardly extending member for biasing said clutching member towards said clutch plate.

7. The drive as defined in claim 6 wherein said electromagnetic magnetic clutch means includes a stationary core including a plurality of axially extending pins and wherein said armature includes a like number of openings for receiving said pins.

* * * * *